Aug. 10, 1943.  D. E. TRUCKSESS  2,326,313
ALARM CIRCUIT
Filed Feb. 27, 1941

INVENTOR
D. E. TRUCKSESS
BY
ATTORNEY

Patented Aug. 10, 1943

2,326,313

UNITED STATES PATENT OFFICE 2,326,313

ALARM CIRCUIT

David E. Trucksess, Summit, N. J., assignor to Bell Telephone Laboratories, Incorporated, New York, N. Y., a corporation of New York Application February 27, 1941, Serial No. 380,763

8 Claims. (Cl. 177—311)

This invention relates to voltage rectifying systems and particularly to means for indicating failure of such systems to rectify an applied alternating voltage.

In battery charging systems involving rectifiers for translating alternating current into direct current, it is important that any failure of the rectifying elements to properly rectify the applied alternating potential may be known immediately.

An object of the invention is, therefore, to provide means for indicating failure of a rectifying device to properly rectify an applied alternating potential.

Arrangements of the prior art are known in which a marginal relay is connected in shunt to the rectifying element of a battery charging rectifier whereby when the rectifier element is functioning properly, i. e., conducting alternate half cycles of an applied alternating current wave, the voltage across the rectifier element during the non-conducting portion of the cycle causes a pulsating direct current to flow in the relay, the average value of which is sufficient to operate and hold the relay, whereas if the rectifier fails an alternating current wave, resulting from superimposing the alternating current supply on the battery, and having a somewhat lower average voltage, is applied to the relay, which voltage is insufficient to hold the relay operated and it therefore releases to close an alarm circuit.

The successful operation of arrangements of the foregoing character require that the relay must operate and release on voltages which are frequently quite close together and such relays, which are constructed to meet this marginal requirement, are relatively expensive to manufacture, frequently difficult to maintain in proper adjustment, and have a relatively light contact pressure which, under certain connditions, may require an auxiliary relay controlled thereby in order to provide suitable contacts to control the desired circuits. Further, such an arrangement imposes a constant current drawn on the charging circuit which although not large may not be desirable under certain conditions.

A feature of the invention resides in substituting for the marginal relay of the prior art, the series combination of a normal relay and a space discharge device having a unidirectional current conducting characteristic, the discharge device being so connected that it will not conduct in the direction of the half wave not passed by the charging rectifier element, i. e., will only conduct on half waves of the polar direction which are passed by the charging rectifier. Under these conditions when the rectifier is charging the battery, the voltage across its electrodes, when conducting, is insufficient to fire the discharge device and as the discharge device does not conduct on the opposite half wave, the relay will not operate.

In case the rectifier element fails to conduct, however, the discharge device will fire and pass current through the relay, causing its operation due to the higher potential across the rectifier electrodes during the conducting half of the applied valve.

The invention will be understood from the following description and accompanying drawing:

Fig. 1 of which shows a simple form of the invention employing a single gas-filled rectifier tube and a three-element cold cathode gas-filled tube serving both as a visual alarm and to control an audible alarm circuit;

Figure 1:
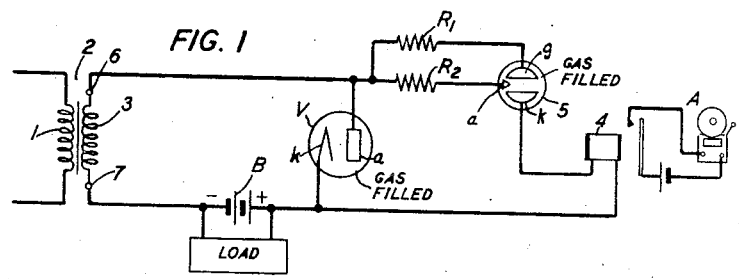

Referring to Fig. 1, a source of alternating current (not shown) is adapted to be connected to the primary winding 1 of a transformer 2 and the secondary winding 3 of the transformer is connected in series with a storage battery B and the electrodes of a gas-filled rectifier device V. A load is shown connected across the battery.

Connected across the anode and cathode of the rectifier V is a relay 4 in series with a three-element cold cathode gas-filled device 5, the anode $a$, and control electrode $g$ in parallel, being connected to the anode $a$ of the rectifier V and the cathode $k$ to the correspondingly designated cathode of the rectifier. In series with both the anode and control electrodes of the device 5 are current limiting resistance R1 and R2, respectively.

Relay 4 is intended to operate on current passed by the main discharge gap of device 5, i. e., anode $a$ to cathode $k$, and to control an obvious alarm circuit A.

The operation of the circuit of the invention is as follows:

As is well known a rectifier conducts when a positive potential of the proper value is applied to its anode and a negative potential to its cathode and, therefore, when terminal 6 of the secondary winding of transformer 3 is positive and terminal 7 is negative a space discharge occurs between the anode and cathode of rectifier V, to the positive terminal battery B and thence to the negative terminal of secondary winding 3, thereby charging the battery B. When the direction of the alternating current is reversed, thus applying a negative potential to the anode $a$ of the rectifier V, which is substantially non-conducting in this direction, no appreciable charging current flows.

During the interval the rectifier is passing current, i. e., when its anode $a$ is positive, the voltage across its terminals is below the value required to ionize the device 5, i. e., to cause a discharge between the control electrode $g$ and the cathode $k$ and hence the main gap (anode $a$ to cathode $k$) is not fired and no current flows through relay 4 to close the audible alarm circuit A.

Conversely, when the alternating potential across the rectifier is reversed and its anode is negative no discharge occurs and consequently the voltage across its terminals is higher which is sufficient to ionize the device 5 by causing a discharge between the electrodes $k$ and $g$, but due to the fact that the device is unilaterally conducting, i. e, a rectifying device, which only discharges the main gap when its anode is positive with respect to its cathode, no current flows to operate relay 4. It will, therefore, be noted that while the rectifier V is functioning properly no glow discharge occurs in device 5 and relay 4 remains inert.

Now let it be assumed that the rectifier V is faulty, due to low emission of its cathode, or for other reasons, a discharge between the anode and cathode may not be effected when the anode is positive and consequently the potential applied to the anode of the rectifier and hence to the anode of the device 5 will build up to an instantaneous value equal to the peak value of the root-mean-square voltage of the transformer 2. Under this condition an ionizing discharge will take place between the control electrode $g$ and cathode $k$ of device 5 thus conditioning the device 5 for a main gap discharge from the anode $a$ to cathode $k$ thereby causing relay 4 to operate and close the audible alarm circuit A. It will be noted that the glow discharge of the device 5, under this condition serves as a visual alarm signal in addition to the audible alarm controlled thereby.

Figure 2:
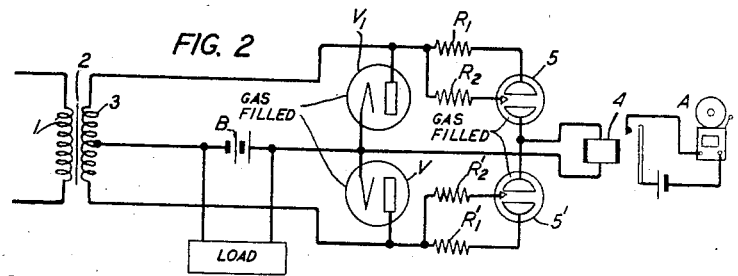
Fig. 2 shows the same type of alarm circuit arrangement for a full-wave rectifier which employs an individual cold cathode tube for each rectifier to control a common audible alarm circuit.

The operation of the arrangement of Fig. 2 is identical with that of Fig. 1, the only difference being that a full wave rectifier comprising rectifying tubes V1 and V2 is employed with each of which rectifier tubes is associated an individual three-element discharge tube, 5 and 5', respectively, which functions in response to failure of the respective rectifier tube to control a common relay 4 and alarm circuit A.

Figure 3:
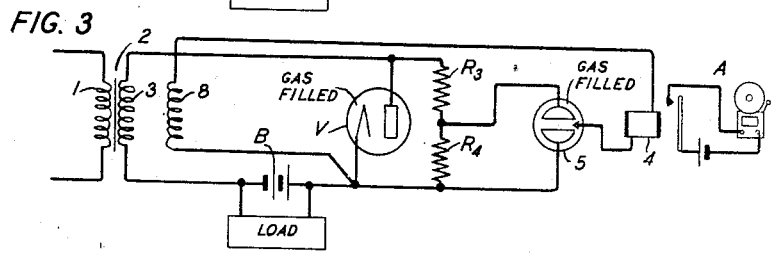
Fig. 3 shows an arrangement employing the same type of cold cathode tube for giving a visual alarm, and for controlling an audible alarm circuit, for use where higher voltage charging circuits are employed and the main gap potential of the cold cathode tube is obtained from a third winding on the input transformer.

The circuit of Fig. 3 is similar to that of Fig. 1 except that it is arranged for use under conditions where the potential across the secondary winding 3 is sufficiently high to produce a voltage across the rectifier electrodes, in the conducting condition, which is equal to the voltage necessary to cause an ionizing discharge between the control electrode and cathode of the tube 5. In this circuit the resistance elements R3 and R4 are connected in series across the rectifier terminals and the control gap of the device 5 is connected across element R2 which is adjusted to apply the proper reduced potential across the control gap of device 5. In this case the potential for the main gap, i. e., between the anode and cathode of device 5 is obtained from a third winding 8 on the transformer 2.

Figure 4:
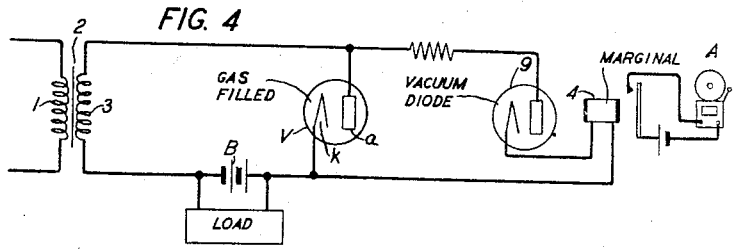
Fig. 4 shows the use of a two-element vacuum rectifier tube (diode) and a marginal relay as a means for controlling an audible alarm circuit.

In Fig. 4 the circuit shown is similar to Fig. 1 except that a hot cathode diode or vacuum rectifier 9 is used in place of a three-element gas-filled device, as shown in the preceding figures and the principal difference is that while practically no anode current flows in the device 5 of Fig. 1, for example, until the rectifier V fails, in the arrangement of Fig. 4 the vacuum tube diode 9 passes a small current even while the rectifier V is operating normally, thus indicating the requirement that the relay 4 of this arrangement be marginal, i. e., non-operate on one value of current and operate on a slightly higher value.

Figure 5:
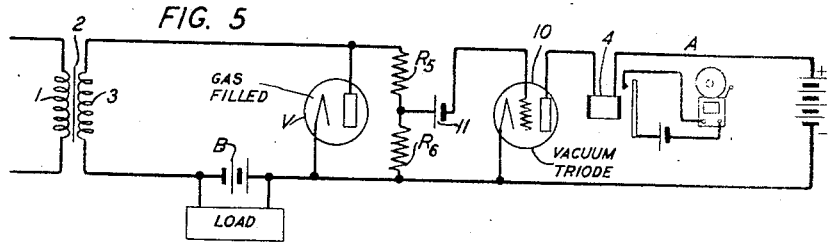
Fig. 5 shows a three-element vacuum tube (triode) employed to respond to a failure of the rectifier tube to control an alarm circuit.

Fig. 5 shows a circuit using a triode vacuum tube 10, instead of a diode as shown in Fig. 4, together with a potentiometer comprising resistance elements R5 and R6 connected in series across the rectifier V similar in arrangement to resistance elements R3 and R4 of Fig. 3, and for the same purpose, i. e., to maintain the triode 10 in a non-conducting condition as long as the rectifier functions properly. If the rectifier tube V should fail the voltage across resistance element R6 increases rapidly to a value which overcomes the grid battery potential 11 and thereby drives the grid positive with respect to the cathode which permits current to flow in the plate circuit to operate relay 4.

What is claimed is:

1. In a rectifying system, the combination of a source of alternating current, a rectifier element having an anode and a cathode, and a load circuit all connected in series, a relay, a gas-filled discharge tube having an anode, a cathode, and a control electrode, said tube being so constructed that current of a substantial value will only flow in the direction of the anode to the cathode when a discharge is established therebetween, a high resistance connection between the anode of said rectifier element and the anode of the tube, a second high resistance connection between said rectifier anode and the control electrode of the tube, and a connection between the cathode of said rectifier and said tube cathode serially including said relay.

2. In a rectifying system, the combination of a source of alternating current, a rectifier element having an anode and a cathode, and a load circuit, all connected in series, a relay, a gas-filled discharge tube having an anode and a cathode so constructed that current of a substantial value will only flow in a direction from the anode to the cathode, and an alarm circuit connected in shunt to said rectifier element serially including a high resistance, said tube anode and cathode, and said relay, said tube being so connected in the circuit that its anode will always be of the same polarity as the anode of the rectifier element.

3. In a rectifying system, a source of alternating current and a rectifier element comprising an anode and a cathode, a potentiometer in shunt with said rectifier element, a vacuum triode having an anode, a cathode, and a grid, a connection between said two cathodes, a connection including a source of grid bias potential between said grid and a point in said potentiometer, and a plate circuit for said triode including a current source, a relay, and the anode and cathode thereof, the values of said potentiometer, grid potential source, and plate current source being so chosen with respect to said triode, and alternating current source, that when said rectifier element is functioning in a normal manner and passing current in response to alternate half waves of said alternating current, said triode will be non-conducting, but in case of failure of said rectifying element to pass current the rise in potential across the potentiometer due to the recurrence of half waves of alternating current of the polarity which normally causes said rectifier element to conduct, the potential of said triode grid will be increased in a positive direction to cause plate current to flow therein and operate said relay.

4. In a rectifying system comprising a source of alternating current, a load circuit connected thereto, and a rectifier having an anode and a cathode serially connected in said load circuit, means for indicating failure of said rectifier to conduct, said means comprising a relay and a space discharge device having an anode, a cathode, and a control electrode, an input circuit for said space discharge device including said cathode and control electrode connected in shunt to said rectifier in such a direction that the polarity of said space discharge cathode will be the same, at any instant, as the polarity of said rectifier cathode, and an output circuit for said space discharge device serially including its anode and cathode, the relay, and a source of potential, said space discharge device being so constructed and the shunt connection of said input circuit to the rectifier so adjusted that an insufficient potential will exist between the control electrode and cathode of said tube when said rectifier is conducting to permit sufficient current to flow in said output circuit to operate said relay, and when the potential between the anode and cathode of said rectifier is increased above a predetermined value due to the failure of said rectifier to conduct, the potential between said control electrode and cathode of said tube will be sufficient to cause a sufficient current to flow in said output circuit to operate said relay.

5. In a rectifying system, the combination of a source of alternating current, a gaseous rectifier having an anode and a cathode connected to said source, and an alarm circuit for indicating failure of said rectifier, said alarm circuit including an alarm device and a rectifying space discharge tube having an anode, a cathode, and a control element, an output circuit for said tube including its anode and cathode, the alarm device, and a source of potential, and an input circuit for said tube including its cathode and control element, said input circuit being connected in shunt with said rectifier in such a direction that the polarity of the tube cathode, at any instant, is the same as the polarity of said rectifier cathode, and the constants of said alarm circuit are so chosen that a current flow is established in said output circuit to control said alarm device when the potential between the terminals of said rectifier is increased to a predetermined high value.

6. In a rectifying system, the combination of a source of alternating current, a gaseous rectifier having an anode and a cathode connected in said source, and an alarm circuit for indicating failure of said rectifier, said alarm circuit comprising an alarm device and a rectifying space discharge tube having an anode, a cathode, and a control element, an output circuit for said tube including its anode and cathode, said alarm device and said source of alternating current connected in such a manner that the polarity of said tube anode will be the same at any instant as the polarity of said rectifier anode, and an input circuit for said tube including its cathode and control element, a resistance in shunt to said rectifier, a connection between said cathode and control element to points in said resistance such that the polarity of both cathodes with respect to their corresponding anodes will be the same at any instant and the constants of said alarm circuit are so chosen that a current flow is established in said output circuit to control said alarm device when the potential between the terminals of said rectifier is increased above a predetermined value.

7. In a rectifying system comprising a source of alternating current, a rectifier having an anode and a cathode connected thereto to provide a unilateral conducting path for said source, and means for indicating failure of said rectifier to conduct, said means comprising an electro-responsive device and a thermionic space discharge tube having an anode, a cathode and a control electrode, an input circuit for said tube including its cathode and control electrode connected in shunt to said rectifier in such a direction that the polarity of both cathodes will be the same at any instant, and an output circuit for said tube including its anode, cathode, electro-responsive device, and the alternating current source.

8. In a rectifying system, the combination of a source of alternating current, a gaseous rectifier having an anode and a cathode, and a load circuit all connected in series, a relay, a gas-filled discharge tube having an anode, a cathode, and a control electrode, said tube being so constructed that current of a substantial value will only flow in the direction of the anode to the cathode to establish a discharge therebetween, an input circuit for said discharge tube including its cathode and control electrode, and connected in shunt to said rectifier in such a direction that the cathodes of said rectifier and tube are of the same polarity at any instant, and an output circuit for said tube serially including its anode and cathode, said relay and said source of alternating current.

DAVID E. TRUCKSESS.